United States Patent
Huang

(10) Patent No.: US 9,961,392 B2
(45) Date of Patent: May 1, 2018

(54) METHOD, APPARATUS AND SYSTEM OF SYNCHRONIZING AUDIO WITH VIDEO

(71) Applicant: TENCENT TECHNOLOGY (SHENZHEN) COMPANY LIMITED, Shenzhen, Guangdong (CN)

(72) Inventor: Jiawen Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 6 days.

(21) Appl. No.: 15/092,443

(22) Filed: Apr. 6, 2016

(65) Prior Publication Data
US 2016/0234544 A1    Aug. 11, 2016

Related U.S. Application Data

(63) Continuation of application No. PCT/CN2014/087514, filed on Sep. 26, 2014.

(30) Foreign Application Priority Data

Oct. 25, 2013    (CN) .......................... 2013 1 0509334

(51) Int. Cl.
H04N 5/04        (2006.01)
H04N 21/43       (2011.01)
(Continued)

(52) U.S. Cl.
CPC ........... *H04N 21/4307* (2013.01); *H04N 5/04* (2013.01); *H04N 5/08* (2013.01); *H04N 21/2368* (2013.01);
(Continued)

(58) Field of Classification Search
CPC combination set(s) only.
See application file for complete search history.

(56) References Cited

U.S. PATENT DOCUMENTS 5,594,660 A    1/1997   Sung et al.
6,480,902 B1   11/2002  Yuang et al.
(Continued)

FOREIGN PATENT DOCUMENTS

CN    101616331        12/2009
CN    102075767 A      5/2011
(Continued)

OTHER PUBLICATIONS

Office Action dated Mar. 28, 2017 in Chinese Application No. 2013105093347.
(Continued)

*Primary Examiner* — Kieu Oanh T Bui
(74) *Attorney, Agent, or Firm* — Knobbe Martens Olson & Bear LLP

(57) ABSTRACT

The present disclosure provides a method, apparatus and a system of synchronizing audio with video. A receiving device receives a video signal embedded with a video sync signal and an audio signal embedded with an audio sync signal provided by a sending device; searches for the video sync signal in the video signal, searches for the audio sync signal in the audio signal; and processes the video signal and the audio signal according to a time when the video sync signal occurs in the video signal and a time when the audio sync signal occurs in the audio signal to make the processed audio signal synchronized with the processed video signal during playback.

20 Claims, 6 Drawing Sheets

--- an encoding side apparatus receives an input bit stream, separates the input bit stream into a video signal and an audio signal, embeds a video sync signal into the video signal, embeds an audio sync signal into the audio signal, and encapsulates the video signal and the audio signal into an output bit stream    ⟋ S41 a decoding side apparatus obtains the video signal and the audio signal from the output bit stream, extracts the video sync signal from the video signal, extracts the audio sync signal from the audio signal, and sends signal adjustment information to the encoding side apparatus if the audio sync signal is not synchronized with the video sync signal    ⟋ S42

(51) Int. Cl.
*H04N 21/2368* (2011.01)
*H04N 21/434* (2011.01)
*H04N 21/8547* (2011.01)
*H04N 5/08* (2006.01)
*H04N 21/845* (2011.01)

(52) U.S. Cl.
CPC ..... *H04N 21/4342* (2013.01); *H04N 21/8456* (2013.01); *H04N 21/8547* (2013.01)

(56) References Cited

U.S. PATENT DOCUMENTS

| | | | |
|---|---|---|---|
| 8,363,161 B2 * | 1/2013 | Pearlstein | H04N 21/2368 348/515 |
| 2002/0076083 A1 * | 6/2002 | Levy | G06T 1/0028 382/100 |
| 2007/0247550 A1 | 10/2007 | Plaunt | |
| 2007/0276670 A1 * | 11/2007 | Pearlstein | H04N 21/2368 704/270 |
| 2012/0033134 A1 | 2/2012 | Strein et al. | |
| 2013/0114847 A1 | 5/2013 | Petrovic et al. | |

FOREIGN PATENT DOCUMENTS

| | | |
|---|---|---|
| CN | 102572445 | 7/2012 |
| CN | 102932673 A | 2/2013 |
| JP | H08280008 | 10/1996 |

OTHER PUBLICATIONS

International Search Report for International Application No. PCT/CN2014/087514, dated Dec. 31, 2014, 4 pages.
International Preliminary Report on Patentability and Written Opinion of the International Searching Authority for International Application No. PCT/CN2014/087514, dated May 6, 2016, 7 pages.

* cited by examiner

US 9,961,392 B2

METHOD, APPARATUS AND SYSTEM OF SYNCHRONIZING AUDIO WITH VIDEO

CROSS-REFERENCE TO RELATED APPLICATIONS

This application is a continuation of International Application No. PCT/CN2014087514, filed on Sep. 26, 2014, which claims priority to Chinese patent application No. 201310509334.7, filed on Oct. 25, 2013, the content of which are incorporated herein by reference in their entirety.

FIELD

The present disclosure relates to information processing techniques, and particularly to a method, apparatus and system of synchronizing audio with video.

BACKGROUND

In processing of video with sound, the original audio and original video will go through different encoders for encoding at an encoding side. A multiplexer combines the audio stream with the video stream into one stream which is then transmitted. After receiving the stream, a decoding side apparatus uses a demuxer to separate the audio stream and the video stream, and decode the audio stream and the video stream separately. Then the decoded audio content and video content are presented at a playing apparatus.

In order to avoid an audio out of synchronization with a video, conventional mechanisms generally add a timestamp in the audio and video bit streams to enable the playing apparatus to play the audio content and video content in specified order and speed.

The timestamps in the audio stream and the video stream are not dependent on each other, so the use of timestamps can not guarantee the synchronization between the audio and the video during playback.

SUMMARY

Embodiments of the present disclosure provide a method, apparatus and system of synchronizing audio with video, to achieve accurate synchronization between audio and video.

A method of synchronizing audio with video may include: receiving, by a receiving device, a video signal embedded with a video sync signal and an audio signal embedded with an audio sync signal provided by a sending device; searching for the video sync signal in the video signal, searching for the audio sync signal in the audio signal; and processing the video signal and the audio signal according to a time when the video sync signal occurs in the video signal and a time when the audio sync signal occurs in the audio signal to have the processed audio signal synchronized with the processed video signal during playback.

An apparatus of synchronizing audio with video may include a processor and a memory; the memory stores computer-executable instructions capable of making the processor to: receive a video signal embedded with a video sync signal and an audio signal embedded with an audio sync signal provided by a sending device; search for the video sync signal in the video signal, search for the audio sync signal in the audio signal; and process the video signal and the audio signal according to a time when the video sync signal occurs in the video signal and a time when the audio sync signal occurs in the audio signal to have the processed audio signal synchronized with the processed video signal during playback.

A system of synchronizing audio with video may include a sending device and a receiving device, the receiving device receives a video signal embedded with a video sync signal and an audio signal embedded with an audio sync signal provided by a sending device; searches for the video sync signal in the video signal, searches for the audio sync signal in the audio signal; and processes the video signal and the audio signal according to a time when the video sync signal occurs in the video signal and a time when the audio sync signal occurs in the audio signal to have the processed audio signal synchronized with the processed video signal during playback.

According to various embodiments of the present disclosure, audio content and video content may have respective sync information embedded, and an audio signal and a video signal may be adjusted according to synchronization between the audio sync information and the video sync information.

BRIEF DESCRIPTION OF THE DRAWINGS

Features of the present disclosure are illustrated by way of example and not limited in the following figures, in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

Figure 1:
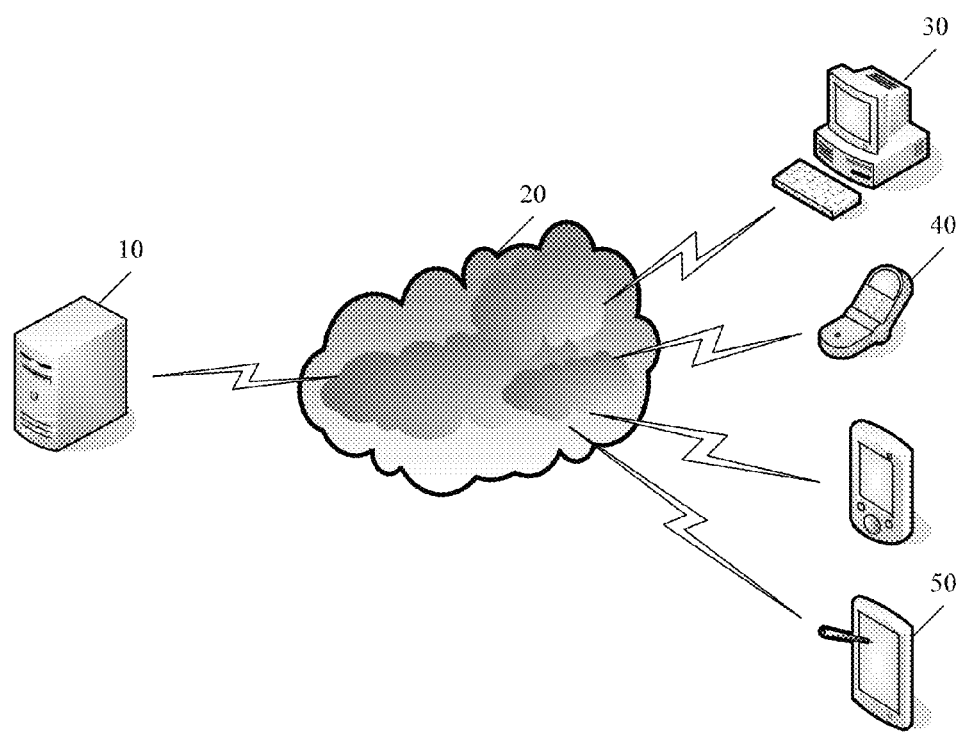
FIG. 1 is a schematic diagram illustrating a system in accordance with examples of the present disclosure.

FIG. 1 is a schematic diagram illustrating a communication system in accordance with examples of the present disclosure. As shown in FIG. 1, the communication system may include a server 10, a communication network 20 and terminal devices. A terminal device may be a personal computer 30, a mobile phone 40, a tablet computer 50, or other mobile Internet devices (MID), e.g., e-book reading devices, portable game consoles and the like that are capable of accessing the Internet via various wireless communications techniques. Both the server and the terminal devices may perform the encoding method and decoding method of various examples. In the following, an apparatus that implements the encoding method and the decoding method is referred to as a computing device or a computer.

Figure 2:
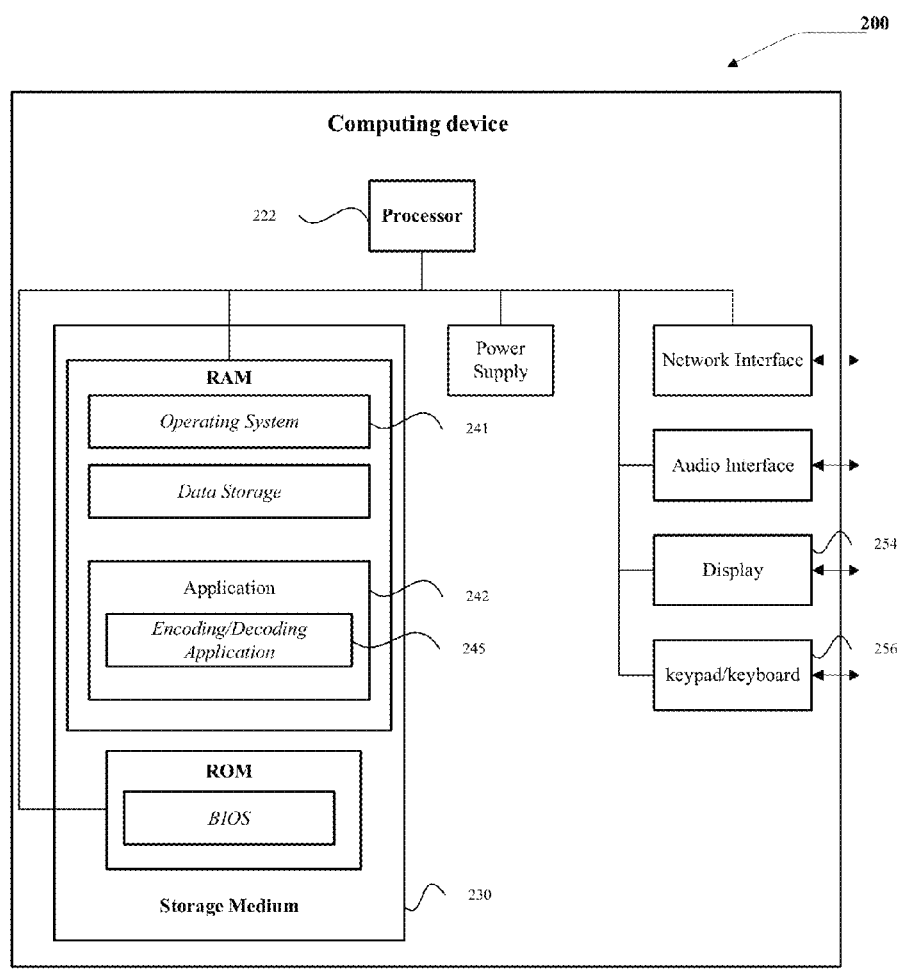
FIG. 2 is a schematic diagram illustrating modules of a computing device in accordance with examples of the present disclosure.

In an example, the encoding apparatus and/or the decoding apparatus may be a computing device that may execute methods and software systems of various examples of the present disclosure. FIG. 2 is a schematic diagram illustrating an example of a computing device. As shown in FIG. 2, the computing device 200 may be a computer capable of executing a method and software system of the present disclosure. The computing device 200 may, for example, be a device such as a personal desktop computer or a portable device, such as a laptop computer, a tablet computer, a cellular telephone, or a smart phone. The computing device 200 may also be a server that connects to the above devices locally or via a network.

The computing device 200 may vary in terms of capabilities or features. Claimed subject matter is intended to cover a wide range of potential variations. For example, the computing device 200 may include a keypad/keyboard 256. It may also comprise a display 254, such as a liquid crystal display (LCD), or a display with a high degree of functionality, such as a touch-sensitive 2D or 3D display. In contrast, however, as another example, a web-enabled computing device 200 may include one or multiple physical or virtual keyboards, and mass storage medium 230.

The computing device 200 may also include or may execute a variety of operating systems 241, including an operating system, such as a Windows™ or Linux™, or a mobile operating system, such as iOS™, Android™, or Windows Mobile™. The computing device 200 may include or may execute a variety of possible applications 242, including an application, such as an encoding/decoding application 245. An application 242 may perform encrypted communication with other device via a network.

Further, the computing device 200 may include one or multiple non-transitory processor-readable storage media 230 and one or multiple processors 222 in communication with the non-transitory processor-readable storage media 230. For example, the non-transitory processor-readable storage media 230 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 230 may store a series of instructions, or units and/or modules that comprise the series of instructions, for conducting operations described in the present disclosure. The one or more processors may be configured to execute the series of instructions and perform the operations in examples of the present application.

Figure 3:
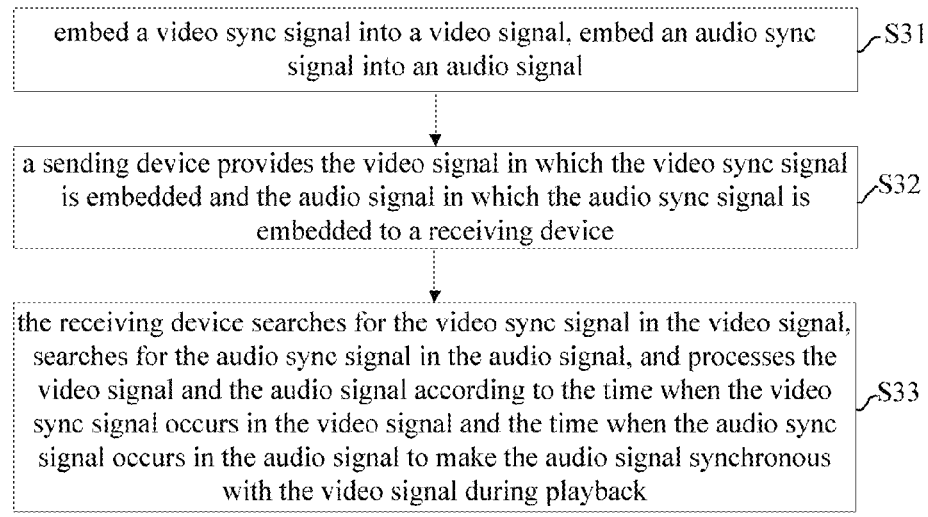
FIG. 3 is a flowchart of a method of synchronizing audio with video in accordance with examples of the present disclosure.

FIG. 3 is a flowchart of a method of synchronizing audio with video in accordance with the present disclosure. As shown in FIG. 3, the method may include the following procedures.

At block S31, a video sync signal is embedded into a video signal, and an audio sync signal is embedded into an audio signal.

At block S32, a sending device provides a receiving device with the video signal embedded with the video sync signal and the audio signal embedded with the audio sync signal.

In an example, the sending device may encode the video signal and the audio signal using an encoder, encapsulate the encoded video signal and the encoded audio signal into an output bit stream, and send the output bit stream to the receiving device.

At block S33, the receiving device searches for the video sync signal in the video signal, searches for the audio sync signal in the audio signal, processes the video signal and the audio signal according to the time of the video sync signal in the video signal and the time of the audio sync signal in the audio signal to have the audio signal synchronized with the video signal during playback.

In an example, the receiving device may obtain a time difference between the time when the video sync signal occurs in the video signal and the time when the audio sync signal occurs in the audio signal, and advance or delay the video signal or the audio signal by the time difference to have the audio signal synchronized with the video signal during playback.

In an example, the receiving device may provide the time difference to the sending device to enable the sending device to advance or delay the video signal or the audio signal by the time difference.

In an example, the procedure of advancing the video signal or the audio signal by the time different may include: deleting video frames from the video signal, and the number of deleted video frames corresponds to the time difference, or deleting an audio segment from the audio signal and the duration of the deleted audio segment corresponds to the length of the time difference. In an example, the procedure of delaying the video signal or the audio signal by the time different may include: inserting video frames into the video signal and the number of inserted video frames corresponds to the time difference, or inserting an audio segment into the audio signal and the duration of the inserted audio segment corresponds to the length of the time difference.

In an example, the video signal and the audio signal are collected in real time by the sending device, the video sync signal is embedded into one or plural collected video frames, and the audio sync signal is embedded into an audio segment collected at the same time with the video frames.

In an example, the video signal and the audio signal are extracted from a video file, and the video sync signal and the audio sync signal are embedded at the same playback time position of the video signal and the audio signal in the video file.

Figure 4:
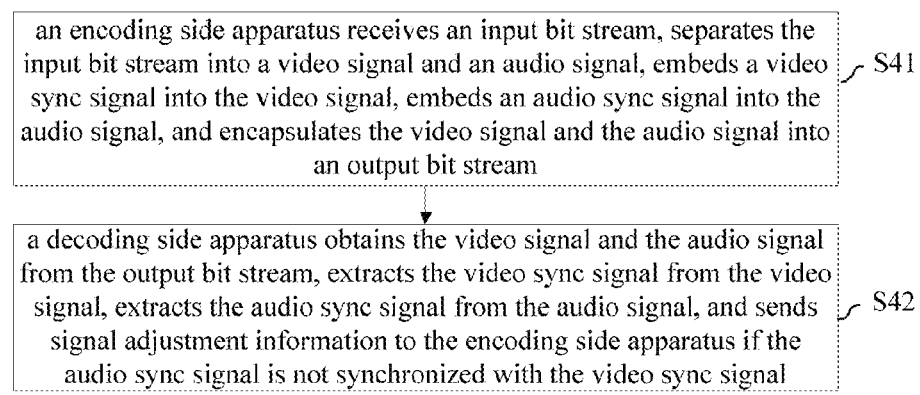
FIG. 4 is a flowchart of a method of synchronizing audio with video in accordance with examples of the present disclosure.

FIG. 4 is a flowchart of a method of synchronizing audio with video in accordance with examples of the present disclosure. As shown in FIG. 4, the method may include the following procedures.

At block S41, a device on an encoder side, which is also referred to as a sending device (or encoding side apparatus), receives an input signal (also referred to as input bit stream), separates the input signal into a video signal and an audio signal, embeds a video sync signal into the video signal, embeds an audio sync signal into the audio signal, and encapsulates the video signal and the audio signal into an output bit stream.

The sending device and the encoder may be located within the same physical device, or in different physical devices. The sending device is capable of communicating data with the encoder through a communication link or a communication network. The sending device is capable of communicating with the receiving device on a decoder side via a communication network.

The input signal may be from another device collecting audio and video, or may be a signal collected by the sending device.

The input signal may be a signal of a video file with audio, and may include at least one audio signal and at least one video signal. In an example, the sending device may first decode the video file to obtain a decoded signal, and separate the decoded signal into a video signal and an audio signal.

The sending device may embed a video sync signal into the video signal, and embed an audio sync signal into the audio signal, encode the video signal and the audio signal using an encoder, and encapsulate the encoded video signal and the encoded audio signal into an output bit stream.

The audio sync signal is synchronized with the video sync signal, i.e., the time position in the audio signal where the audio sync signal is inserted is the same with the time position in the video signal where the video sync signal is inserted. If the input signal is collected in real time by an encoder side apparatus, e.g., the sending device, the sending time may insert the sync signals into a video segment of the video signal and an audio segment of the audio signal, and the video segment and the audio segment are collected within the same time period. In another example, the device may simultaneously insert the video sync signal and the audio sync signal while collecting the video signal and the audio signal in real time. If the input signal is obtained by decoding a video file, the encoder side apparatus may insert the sync signals into a video segment and an audio segment that have the same playback time point or the same playback time period in the video file.

The audio sync signal and the video sync signal corresponding to the same playback time may have the same or corresponding content based on which it can be determined whether the audio signal and the video signal are synchronous. The content of the sync signals may include the time the audio/video was collected, the time point of a video frame in a source video and the time point of an audio segment in a source audio signal, a pre-determined value or a sequence, or another time-variable or time-invariable signal, or the like.

In an example, a time or other information may be converted into a value or a sequence as the sync signal using a pre-determined formula.

In an example, a signal which is invisible to human eyes may be embedded into the video signal as the video sync signal. For example, the value (color value or grayscale value) or the position (absolute position or relative position) of one or plural pixels may be used to bear the video sync signal.

According to various examples, the procedure of embedding the video sync signal into the video signal may include at least one of the following methods. In an example, the value of a pre-determined pixel in a video frame sequence is set as the video sync signal. The value of a pixel may be a color value, e.g., RGB value, YUV value, or a grayscale value. With respect to RGB value or YUV value, one of the three values of the pre-determined pixel, i.e., one of R value, G value and B value, or one of Y value, U value and V value, may be used for bearing the video sync signal. In another example, a value to be inserted into the current frame may be converted into the three values of RGB or YUV using a pre-determined formula. In an example, different value ranges of color value or grayscale value may be used to denote different values, e.g., a value range of 0~31 denotes "0", a value range of 32~64 denotes "1", a value range 64~95 denotes "2", . . . and so on.

In an example, a relation between the positions of at least two pixels in a video frame sequence may be set as the video sync signal.

In an example, a relation between the positions of the same pixel(s) in different frames of a video frame sequence may be set as the video sync signal. For example, the position (1, 1) is the pre-determined position, and the value of a pixel at the position in an initial frame may be set to be a pre-determined value. Then the change in position of the pixel with the pre-determined value may be monitored, and the video sync signal can be extracted from the monitored position change.

Figure 5:
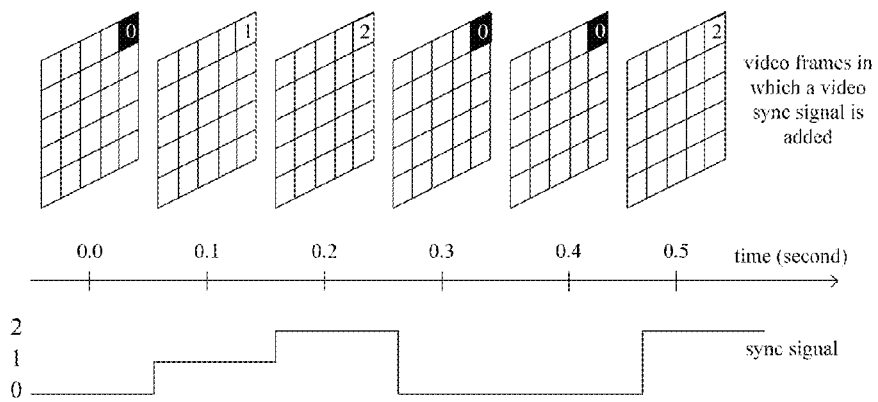
FIG. 5 is a schematic diagram illustrating a video sync signal in accordance with examples of the present disclosure.

Any pixel in each frame may be used for bearing the video sync signal. FIG. 5 is a schematic diagram of a video sync signal in accordance with the present disclosure. In the example as shown in FIG. 5, the pixel at the upper right corner of a video frame may specify the value of the video sync signal at the time point of the video frame. The sync signal can be obtained only by combining a digit sequence with decoding time points. Suppose a video signal is sampled with a sample interval of 0.1 second, and the sync signal from 0.0 to 0.4 second is "01200". If the video sync signal is a sequence having a length of 5, a sliding window whose size is 5 may be used for extracting the video sync signal. For example, a sequence extracted at 0.4 second is "01200"; when the sliding window slides to 0.1~0.5 second, a sequence extracted is "12002". The above is only an example. The video sync signal may be extracted using other methods.

Video encoding schemes are generally lossy video encoding schemes. The value of a pixel in an original video frame may not be recovered accurately, thus the accuracy becomes a problem. Therefore, some examples use a value range to denote a value, e.g., 0~31 denotes "0", 32~63 denotes "1", 64~95 denotes "2", . . . or the like. The above example takes one pixel as an example. In other examples, an area or plural pixels may be used to bear the video sync signal. The receiving device may obtain the value of the area or the plural pixels as a sample of the video sync signal. If there are 25 frames per second, a maximum of 25 samples of the sync signal can be obtained per second. The accuracy of the samples is decided by the number of pixels used and the accuracy of the value of each pixel.

In some examples, the video signal may go through multiple encoding and decoding processes during transmission, the bit rate and the frame rate may be changed, and the value of a pixel may fluctuate. Thus, the receiving device may only monitor the tendency in change of a pixel value which bears the video sync signal, and judges whether the video sync signal appears currently or which is the current video sync signal according to a pre-determined probability-based criterion, instead of extracting the video sync signal and obtaining the value or sequence of the video sync signal strictly according to the pre-determined method for inserting the video sync signal.

In an example, the procedure of embedding the audio sync signal into the audio signal may include at least one of: embedding a sine wave, a square wave, a triangle wave, a pulse signal, or the like into the audio signal using a sound mixing method.

In an example, an audio signal to which human is insensitive may be used as the audio sync signal, e.g., an audio signal with a frequency higher than 18000 Hz or lower than 30 Hz. The audio sync signal can be detected using a band-pass filter. In an example, the value of the audio sync signal may be denoted by the amplitude or frequency of the audio sync signal.

Figure 6:
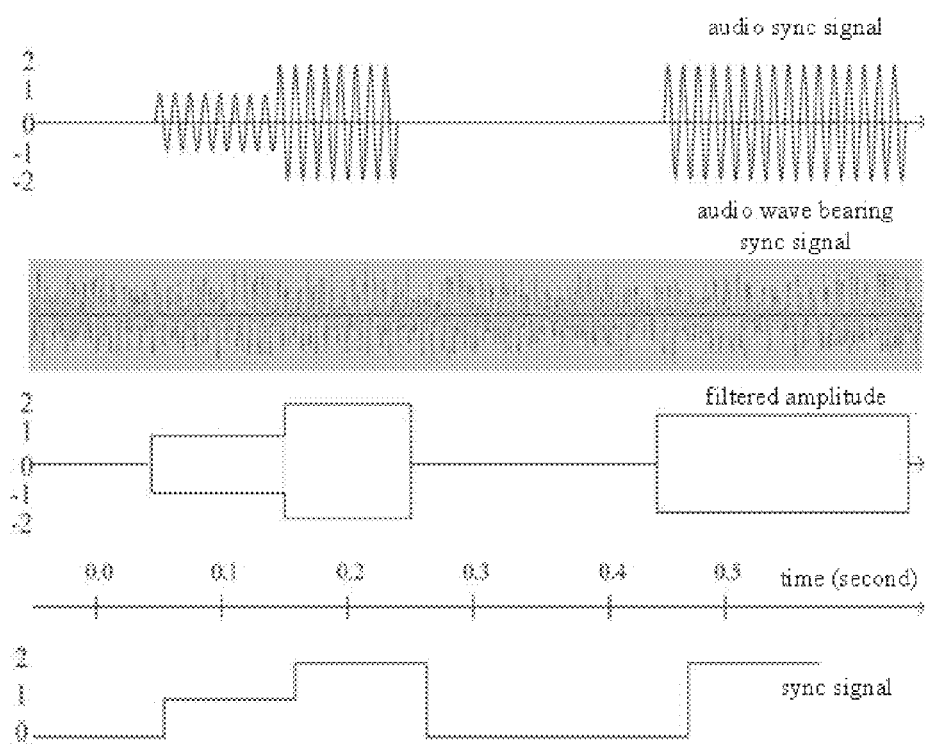
FIG. 6 is a schematic diagram illustrating an audio sync signal in accordance with examples of the present disclosure.

FIG. 6 is a schematic diagram illustrating an audio sync signal in accordance with the present disclosure.

As shown in FIG. 6, after an audio wave is processed through a band-through filter, the remaining signal is the audio sync signal. The audio sync signal may be obtained by calculating the amplitude of the signal outputted by the band-through filter. The amount of samples per second is decided by the sampling interval, and the accuracy of the samples of the audio sync signal is decided by the accuracy of the decoded audio signal and the number of sound channels.

At block S42, a device on the decoder side, referred to as the receiving device, obtains a video signal and an audio signal from a received bit stream, extracts a video sync signal from the video signal, extracts an audio sync signal from the audio signal, and sends signal adjustment information to the sending device when the audio sync signal is not synchronized with the video sync signal.

In an example, the receiving device obtains an output bit stream sent by a decoding side apparatus, parses the bit stream to obtain the video signal and the audio signal, extracts the video sync signal from the video signal and extracts the audio sync signal from the audio signal. When the audio sync signal is not synchronized with the video sync signal, a signal adjustment signal is sent to the sending device.

After extracting the audio sync signal and the video sync signal, the receiving device may compare the audio sync signal with the video sync signal to obtain the time difference between the audio signal and the video signal. The receiving device sends the signal adjustment information which includes the time difference to the sending device. The sending device may delay or advance the audio signal or the video signal according to the time different to make the audio synchronized with the video. For example, when detecting the audio is ahead of the video, the receiving device may send feedback to the sending device so that the sending device may delay the source audio signal by the time difference (e.g., by inserting a mute segment), or advance the source video signal (e.g., by skipping buffered data), to recover the synchronization between the audio and the video.

For example, supposing the sending device and the receiving device pre-determined the sync signal to be "0120", and it is determined the video sync signal appears between 0.0~0.3 second by checking the video sync signal. Regarding audio, the audio sync signal detected from 0.0~0.5 second is "00120", and "0120" appears between 0.1~0.4 second in the audio signal, i.e., the audio has a delay of 0.1 second. Thus, the receiving device may feed back signal adjustment information to the sending device so that the sending device delays the source video by 0.1 second or advance the source audio by 0.1 second to recover synchronization between the audio and the video.

In an example, the method may also include at least one of: the sending device may embed a watermark marking copyright into the video sync signal; embed a watermark marking copyright into the audio sync signal; embed video control information for playback control of the video into the video sync signal; embed auxiliary information related with video playback into the video sync signal; embeds audio control information for playback control of the audio into the audio sync signal; or embed auxiliary information related with audio playback into the audio sync signal.

The sending device may embed pre-determined information into the audio signal sync information or into the video signal sync information, such as the following.

(a) Watermarks

Watermarks may be a pre-determined signal specifying copyright-related information.

(b) Control Information

Control information includes, but not limited to, a time point specifying the opening or ending, a time point at which an advertisement may be inserted, a time point when an important section of a program starts, or information for triggering other functions, or the like.

(c) Other Text Information

Other text information may include URLs, other character strings, or related information presented or used by a playback apparatus, e.g., captions or advertisements, or the like.

In an example, the method may also include: the receiving device judges whether a watermark in the video sync signal is complete, determining the video signal is complete if the watermark is complete, or determining the video signal is incomplete if the watermark is incomplete; and/or the receiving device judges whether a watermark in the audio sync signal is complete, determining the audio signal is complete if the watermark is complete, or determining the audio signal is incomplete if the watermark is incomplete. For example, authentication information may be embedded into the video at different time points for determining the integrity of the video, e.g., whether the video was processed through splicing, whether an audio track was replaced, or the like.

The examples may be applied to various scenarios, e.g., instant messaging systems including video chat systems, audio chat systems, or the like.

Figure 7:
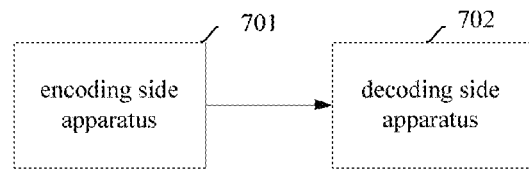
FIG. 7 is a schematic diagram illustrating a system of synchronizing audio with video in accordance with examples of the present disclosure.

FIG. 7 is a schematic diagram of a system of synchronizing audio with video in accordance with the present disclosure.

As shown in FIG. 7, the system includes an encoder side apparatus (i.e., a sending device) 701 and a decoder side apparatus (i.e., a receiving device) 702.

In an example, the receiving device 702 receives a video signal embedded with a video sync signal and an audio signal embedded with an audio sync signal provided by a sending device; searches for the video sync signal in the video signal, searches for the audio sync signal in the audio signal; and processes the video signal and the audio signal according to a time when the video sync signal occurs in the video signal and a time when the audio sync signal occurs in the audio signal to have the processed audio signal synchronized with the processed video signal during playback.

In an example, the receiving device 702 obtains a time difference between the time when the video sync signal occurs in the video signal and the time when the audio sync signal occurs in the audio signal, and advances or delays the video signal or the audio signal by the time difference to have the audio signal synchronized with the video signal during playback.

In an example, the receiving device 702 obtains a time difference between the time when the video sync signal occurs in the video signal and the time when the audio sync signal occurs in the audio signal, and provides the time difference to the sending device 701. The sending device 701 advances or delays the video signal or the audio signal by the time difference.

In an example, the receiving device 702 or the sending device 701 deletes video frames from the video signal and the number of deleted video frames corresponds to the time different, or deletes an audio segment from the audio signal and the duration of the audio segment is the length of the time difference, so as to advance the video signal or the audio signal by the time difference; inserts pre-determined video frames into the video signal and the number of inserted video frames corresponds to the time different, or inserts an audio segment into the audio signal and the duration of the inserted audio segment is the length of the time difference, so as to delay the video signal or the audio signal by the time difference.

In an example, the sending device 701 collects the video signal and the audio signal in real time, and embeds the video sync signal into a video frame and embeds the audio sync signal into an audio segment which is collected at the same time with the video frame; or extracts the video signal and the audio signal from a video file, and embeds the video sync signal and the audio sync signal at the same playback time of the video.

In an example, the encoder side apparatus 701 receives an input bit stream, separates the bit stream into a video signal and an audio signal, embeds the video sync signal into the video signal, embeds the audio sync signal into the audio signal, and encapsulates the video signal and the audio signal into an output bit stream.

The decoder side apparatus 702 obtains a video signal and an audio signal from the output bit stream, extracts a video sync signal from the video signal, extracts an audio sync signal from the audio signal, and sends signal adjustment information to the encoder side apparatus 701 when the audio sync signal is not synchronized with the video sync signal.

The encoder side apparatus 701 receives the signal adjustment information, adjusts the time of the video signal and/or the audio signal to keep the audio signal synchronized with the video signal.

In an example, the encoder side apparatus 701 may embed the video sync signal into the video signal using at least one of: setting a value of a pre-determined pixel in a video frame sequence as the video sync signal; set a relation between at least two pixels in a video frame sequence as the video sync signal; set the relation of the positions of the same pixel in different frames of a video frame sequence as the video sync signal.

In an example, the encoder side apparatus 701 embeds the audio sync signal into the audio signal by at least one of: embedding a sine signal into the audio signal, embedding a rectangular signal into the audio signal, embedding a triangle signal into the audio signal, embedding a pulse signal into the audio signal.

Figure 8:
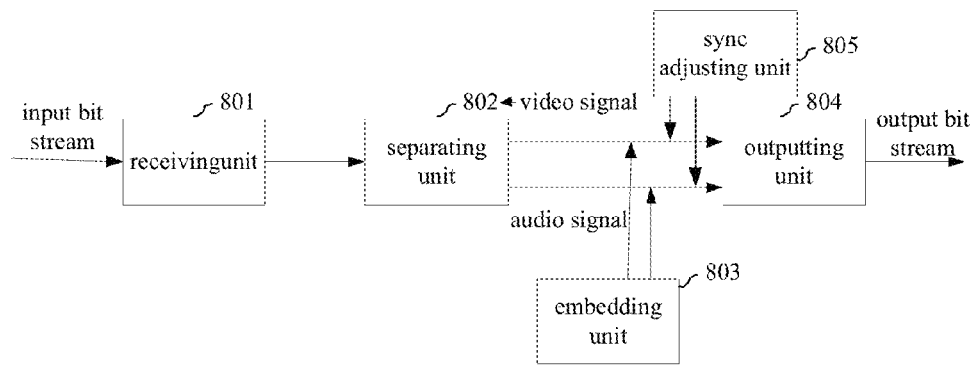
FIG. 8 is a schematic diagram illustrating an apparatus of encoding audio and video in accordance with examples of the present disclosure.

FIG. 8 is a schematic diagram of an apparatus of encoding audio and video in accordance with the present disclosure.

As shown in FIG. 8, the apparatus of encoding audio and video may include a receiving unit 801, a separating unit 802, an embedding unit 803, and outputting unit 804.

The receiving unit 801 receives an input bit stream.

The separating unit 802 separates the input bit stream into a video signal and an audio signal.

The embedding unit 803 embeds a video sync signal into the video signal, and embeds an audio sync signal into the audio signal.

The outputting unit 804 encapsulates the video signal and the audio signal into an output bit stream.

In an example, the apparatus may also include a sync adjusting unit 805 which adjusts the time of the video signal and/or the audio signal according to signal adjustment information fed back by a decoding side apparatus to make the audio signal synchronized with the video signal.

Figure 9:
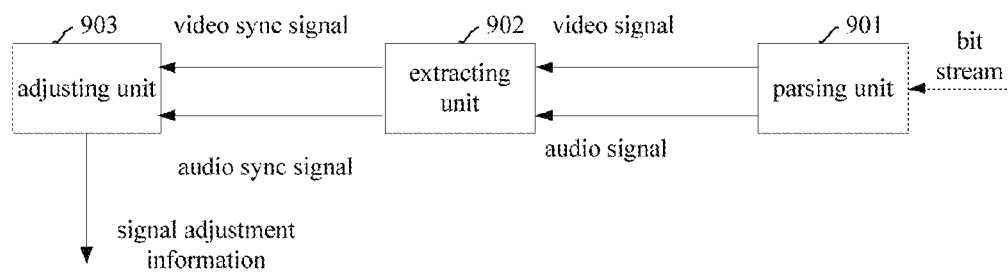
FIG. 9 is a schematic diagram illustrating a system of decoding audio and video in accordance with examples of the present disclosure.

FIG. 9 is a schematic diagram of an apparatus of decoding audio and video in accordance with the present disclosure.

As shown in FIG. 9, the apparatus of decoding audio and video may include a parsing unit 901, an extracting unit 902 and an adjusting unit 903.

The parsing unit 901 parses a received bit stream to obtain a video signal and an audio signal.

The extracting unit 902 extracts a video sync signal from the video signal, and extracts an audio sync signal from the audio signal.

The adjusting unit 903 sends a signal adjustment signal to a sending side apparatus when the audio sync signal is not synchronized with the video sync signal.

In an example, the apparatus may also include a checking unit (not shown in the drawings). The checking unit judges whether a watermark in the video sync signal is complete, determines the video signal is complete if the watermark is complete, or determines the video signal is incomplete if the watermark is incomplete; and/or judges whether a watermark in the audio sync signal is complete, determines the audio signal is complete if the watermark is complete, or determines the audio signal is incomplete if the watermark is incomplete.

Figure 10:
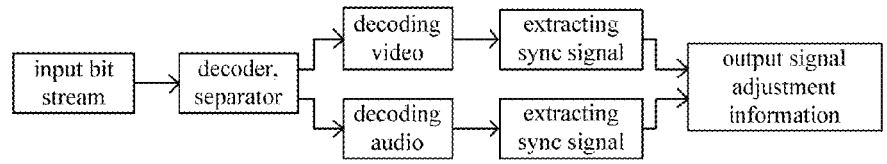
FIG. 10 is a schematic diagram illustrating an apparatus of encoding audio and video in accordance with examples of the present disclosure.
Figure 11:
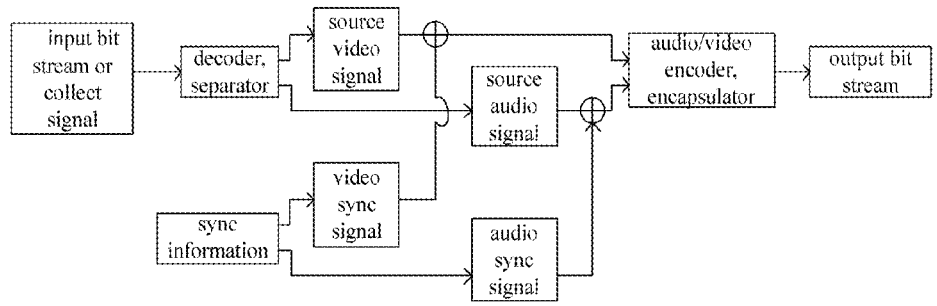
FIG. 11 is a schematic diagram illustrating an apparatus of decoding audio and video in accordance with examples of the present disclosure.

FIG. 10 is a schematic diagram illustrating processing at an encoding side apparatus in accordance with examples of the present disclosure. FIG. 11 is a schematic diagram illustrating a process of synchronizing audio with video in accordance with examples of the present disclosure.

As shown in FIG. 10, at the encoding side, a bit stream is inputted or an audio signal and a video signal are collected. A decoder and a separator are used to obtain a source video signal and a source audio signal. A video sync signal is embedded into the source video signal, and an audio sync signal is embedded into the source audio signal. The audio sync signal and the video sync signal may be from the same sync source. Then the source audio signal in which the audio sync signal is embedded and the source video signal in which the video sync signal is embedded are encoded and encapsulated to generate an output bit stream.

As shown in FIG. 11, at the decoding side, a decoder and a separator are used to separate a decoded video signal and a decoded audio signal from a received input bit stream (i.e., the output bit stream outputted by the encoding side). A video sync signal is extracted from the decoded video signal, and an audio sync signal is extracted from the decoded audio signal. The video sync signal and the audio sync signal are outputted.

Figure 12:
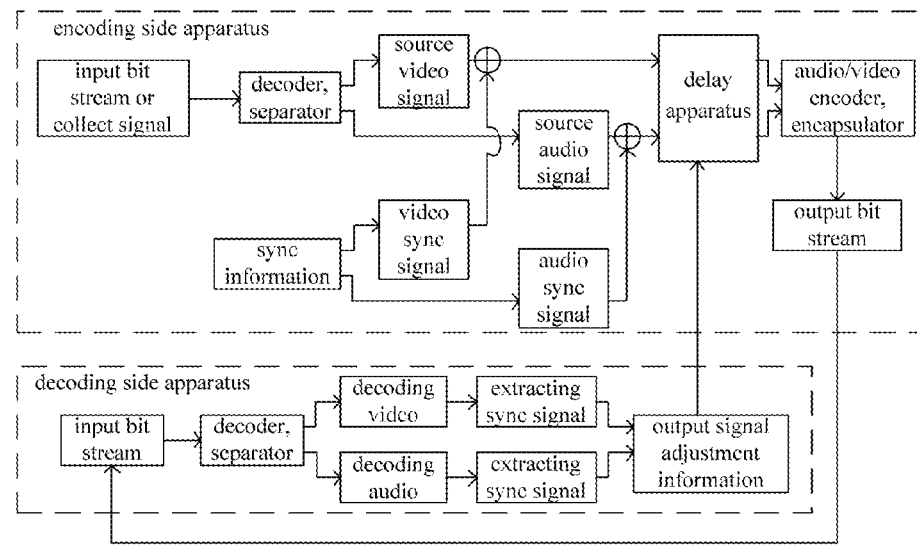
FIG. 12 is a schematic diagram illustrating processing audio and video for synchronization in accordance with examples of the present disclosure.

For example, as shown in FIG. 12, the video sync signal and the audio sync signal may be outputted to a delay apparatus at the encoding side. The delay apparatus judges whether the audio sync signal is synchronous with the video sync signal, and processes the video signal and the audio signal for synchronization if the audio sync signal is not synchronous with the video sync signal.

In another example, the video sync signal and the audio sync signal may be outputted to a judging apparatus at the decoding side. The judging apparatus judges whether the audio sync signal is synchronous with the video sync signal, and sends a time difference to the delay apparatus at the decoding side. The delay apparatus processes the video signal and the audio signal for synchronization using the time difference.

The method of synchronizing audio with video may be implemented in various manners.

The method may be programmed into a plug-in that can be installed in a personal computer, a mobile terminal, or the like, or may be encapsulated into an application which can be downloaded and used by users. When the method is programmed to be a plug-in, the format of the plug-in may be ocx, dll, cab or the like. The method of synchronizing may also be a Flash plug-in, a RealPlayer plug-in, an MMS plug-in, a MIDI plug-in, an ActiveX plug-in or the like.

The method may be stored in various types of storage medium in the form of instructions or an instruction sets. The storage medium may include, but not limited to, floppy disk, compact disk, DVD, hard drive, flash memory, USB flash disk, CF card, SD card, MMC card, SM card, memory stick, xD card, and the like.

The method may also be implemented by Nand flash-based storage medium, such as USB flash disk, CF card, SD card, MMC card, SM card, memory stick, xD card, and the like.

In view of the foregoing, the encoding side apparatus receives an input bit stream, separates the input bit stream into a video signal and an audio signal, embeds a video sync signal into the video signal, embeds an audio sync signal into the audio signal, and encapsulates the video signal and the audio signal into an output bit stream. The decoding side apparatus parses the output bit stream to obtain the video signal and the audio signal, extracts the video sync signal from the video signal, extracts the audio sync signal from the audio signal, and sends signal adjustment information to the encoding side apparatus when the audio sync signal is asynchronous with the video sync signal. Thus, various examples embed sync signals into audio content and video content, and can determine signal adjustment information according to a synchronization state between the audio sync signal and the video sync signal. As such, the audio and video can be made synchronized with each other more accurately.

The examples are suitable for extending, and can be mass applied.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

The hardware modules according to various examples may be implemented by hardware or a hardware platform with necessary software. The software may include machine-readable instructions which are stored in a non-transitory storage medium. Thus, the examples may be embodied as software products.

In various examples, the hardware may be dedicated hardware or general-purpose hardware executing machine-readable instruction. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium is also provided, which is to store instructions executable by a machine to implement the method of various examples. Specifically, a system or apparatus may have a storage medium which stores machine-readable program codes for implementing functions of any of the above examples. A computing device (or a CPU or an MPU) in the system or the apparatus may read and execute the program codes stored in the storage medium. Computer readable instructions corresponding to modules of FIG. 8 or FIG. 9 may make an operating system in a computer to implement part or all of the above described operations. A non-transitory computer-readable storage medium may be a storage device in an extension board inserted in the computer or a storage in an extension unit connected to the computer. Program codes-based instructions can make a CPU or a processor installed in an extension board or an extension unit to implement part or all of the operations to implement any example of the present disclosure.

The non-transitory computer-readable storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

What is claimed is:

1. A method of synchronizing audio with video, comprising:

receiving, by a receiving device, a video signal embedded with a video sync signal and an audio signal embedded with an audio sync signal provided by a sending device, the video sync signal is embedded in the video signal by setting a value of a pixel at a pre-determined position in a video frame of the video signal to be a value corresponding to a value of the video sync signal or setting a pixel with a pre-determined value to be at a position corresponding to a value of the video sync signal in a video frame of the video signal;

extracting the video sync signal from the video signal by mapping one of the following to a value of the video sync signal:
   a value of a pixel at the pre-determined position of a video frame, or
   a relation between positions of at least two pixels each having a pre-determined value in a video frame, or
   a relation between positions of a pixel having a pre-determined value in at least two video frames;
extracting the audio sync signal from the audio signal;
obtaining a time difference by comparing the video sync signal with the audio sync signal; and
processing the video signal and the audio signal according to the time difference to have the processed audio signal synchronized with the processed video signal during playback.

2. The method of claim 1, wherein processing the video signal and the audio signal according to the time difference comprises:
   advancing or delaying one of the video signal and the audio signal to adjust the time difference between the video signal and the audio signal to make the video signal and the audio signal synchronous during playback.

3. The method of claim 1, wherein processing the video signal and the audio signal according to the time difference comprises:
   providing the time different to the sending device which advances or delays one of the video signal and the audio signal to adjust the time difference between the video signal and the audio signal to make the video signal and the audio signal synchronous during playback.

4. The method of claim 1, wherein
   the video sync signal is embedded into at least one video frames; and
   the audio sync signal is embedded into an audio segment which is collected at the same time with the video frames or has the same playback time position with the video frames in a video file from which the video signal and the audio signal are extracted.

5. The method of claim 1, wherein extracting the video sync signal from the video signal comprises at least one of:
   obtaining a value of a pixel at a pre-determined position in a video frame;
   obtaining a relation between positions of at least two pixels each having a pre-determined value in a video frame; or
   obtaining a relation between positions of a pixel having a pre-determined value in two video frames.

6. The method of claim 1, wherein extracting the audio sync signal from the audio signal comprises at least one of:
   mapping an amplitude or a frequency of a sine wave at a frequency band insensitive to human ears of the audio signal to a value of the audio sync signal;
   mapping an amplitude or a frequency of a rectangular wave at a frequency band insensitive to human ears of the audio signal to a value of the audio sync signal;
   mapping an amplitude or a frequency of a triangular wave at a frequency band insensitive to human ears of the audio signal to a value of the audio sync signal; or
   mapping an amplitude or a frequency of a pulse signal at a frequency band insensitive to human ears of the audio signal to a value of the audio sync signal.

7. The method of claim 1, further comprising at least one of:
   embedding watermark information specifying copyright into the video sync signal;
   embedding watermark information specifying copyright into the audio sync signal;
   embedding video control information for controlling video playback into the video sync signal;
   embedding auxiliary information related with video playback into the video sync signal;
   embedding audio control information for controlling audio playback into the audio sync signal; or
   embedding auxiliary information related with audio playback into the audio sync signal.

8. The method of claim 1, wherein extracting the video sync signal from the video signal comprises:
   obtaining a first sequence of values of the video sync signal, each of the values of the video sync signal is obtained from a different set of video frames of the video signal; and
   obtaining a second sequence of values of the audio sync signal, each of the values of the audio sync signal is obtained from a different audio segment of the audio signal;
   wherein obtaining the time difference by comparing the video sync signal with the audio sync signal comprises:
   obtaining the time difference by comparing the first sequence with the second sequence.

9. The method of claim 8, wherein obtaining the first sequence of the values of the video sync signal comprises:
   applying a sliding window having a pre-determined length to values of the video sync signal obtained from a plurality sets of video frames of the video signal; and
   determining values within the sliding window to be the first sequence.

10. The method of claim 8, wherein obtaining the second sequence of the values of the audio sync signal comprises:
   obtaining values of the audio sync signal from a plurality of audio signal segments of the audio signal;
   applying a sliding window having a pre-determined length to the values of the audio sync signal; and
   determining values within the sliding window to be the second sequence.

11. The method of claim 1, wherein mapping the value of the pixel at the pre-determined position of the video frame to the value of the video sync signal comprises:
   obtaining a pre-determined value range to which the value of the pixel belongs; and
   determining a pre-defined value associated with the value range to be the value of the video sync signal.

12. An apparatus of synchronizing audio with video, comprising a processor and a memory storing computer-executable instructions that, when executed by the processor, cause the processor to:
   receive a video signal embedded with a video sync signal and an audio signal embedded with an audio sync signal provided by a sending device, the video sync signal is embedded in the video signal by setting a value of a pixel at a pre-determined position in a video frame of the video signal to be a value corresponding to a value of the video sync signal or by setting a pixel with a pre-determined value to be at a position corresponding to a value of the video sync signal in a video frame of the video signal;
   extract the video sync signal from the video signal by mapping one of the following to a value of the video sync signal:
      a value of a pixel at the pre-determined position of a video frame, or a relation between positions of at least two pixels each having a pre-determined value in a video frame, or a relation between positions of a pixel having a pre-determined value in at least two video frames;

extract the audio sync signal from the audio signal;

obtain a time difference by comparing the video sync signal with the audio sync signal; and process the video signal and the audio signal according to the time difference.

13. The apparatus of claim 12, wherein the instructions further cause the processor to:

advance or delay one of the video signal and the audio signal to adjust the time difference between the video signal and the audio signal to make the video signal and the audio signal synchronous during playback.

14. The apparatus of claim 12, wherein the instructions further cause the processor to:

provide the time different to the sending device which advances or delays one of the video signal and the audio signal to adjust the time difference between the video signal and the audio signal to make the video signal and the audio signal synchronous during playback.

15. The apparatus of claim 12, wherein the instructions further cause the processor to:

obtain a first sequence of values of the video sync signal, each of the values of the video sync signal is obtained from a different set of video frames of the video signal;

obtain a second sequence of values of the audio sync signal, each of the values of the audio sync signal is obtained from a different audio segment of the audio signal; and obtain the time difference by comparing the first sequence with the second sequence.

16. The apparatus of claim 12, wherein the instructions further cause the processor to:

apply a sliding window having a pre-determined length to values of the video sync signal obtained from a plurality sets of video frames of the video signal; and determining values within the sliding window to be the first sequence.

17. A non-transitory computer-readable storage medium, storing instructions executable by at least one processor to:

receive a video signal embedded with a video sync signal and an audio signal embedded with an audio sync signal provided by a sending device, the video sync signal is embedded in the video signal by setting a value of a pixel at a pre-determined position in a video frame of the video signal to be a value corresponding to a value of the video sync signal or by setting a pixel with a pre-determined value to be at a position corresponding to a value of the video sync signal in a video frame of the video signal;

extract the video sync signal from the video signal by mapping one of the following to a value of the video sync signal:

a value of a pixel at the pre-determined position of a video frame, or a relation between positions of at least two pixels each having a pre-determined value in a video frame, or a relation between positions of a pixel having a pre-determined value in at least two video frames;

extract the audio sync signal from the audio signal;

obtain a time difference by comparing the video sync signal with the audio sync signal; and process the video signal and the audio signal according to the time difference.

18. The non-transitory computer-readable storage medium of claim 17, wherein the instructions are executable by the processor to:

advance or delay one of the video signal and the audio signal to adjust the time difference between the video signal and the audio signal to make the video signal and the audio signal synchronous during playback.

19. The non-transitory computer-readable storage medium of claim 17, wherein the instructions are executable by at least one processor to:

provide the time difference to the sending device which advances or delays one of the video signal and the audio signal to adjust the time difference between the video signal and the audio signal to make the video signal and the audio signal synchronous during playback.

20. The non-transitory computer-readable storage medium of claim 17, wherein the instructions are executable by at least one processor to:

obtain a first sequence of values of the video sync signal, each of the values of the video sync signal is obtained from a different set of video frames of the video signal;

obtain a second sequence of values of the audio sync signal, each of the values of the audio sync signal is obtained from a different audio segment of the audio signal; and obtain the time difference by comparing the first sequence with the second sequence.

* * * * *